Jan. 8, 1952     F. P. DUNN     2,581,788
PARKING LOT WAY CONTROL
Filed Sept. 17, 1946     2 SHEETS—SHEET 1
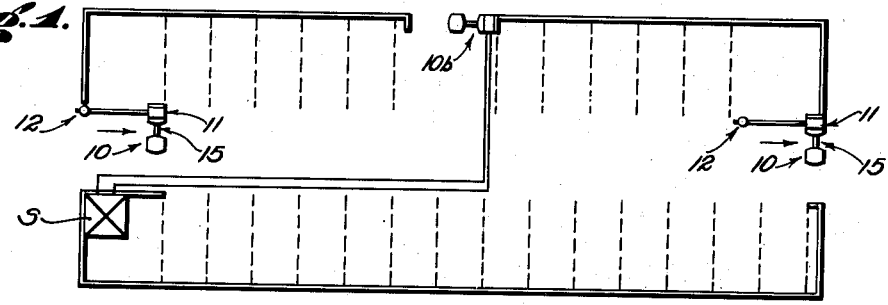
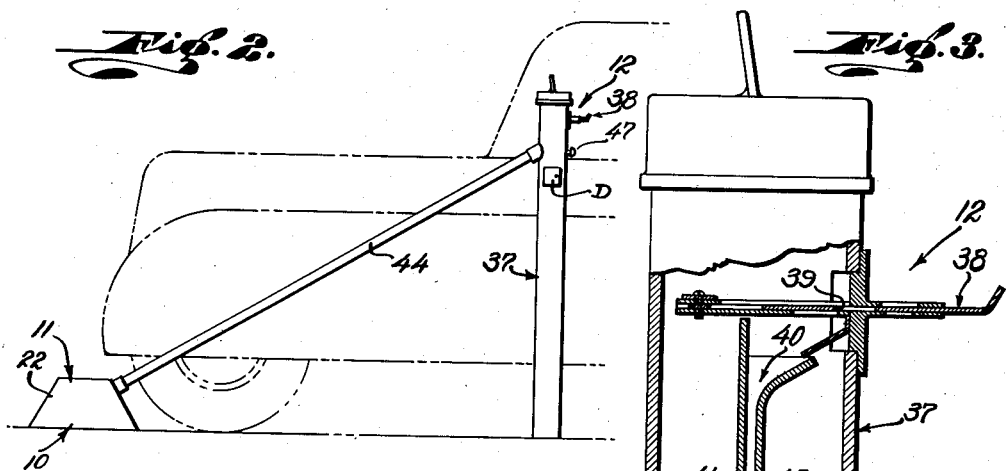
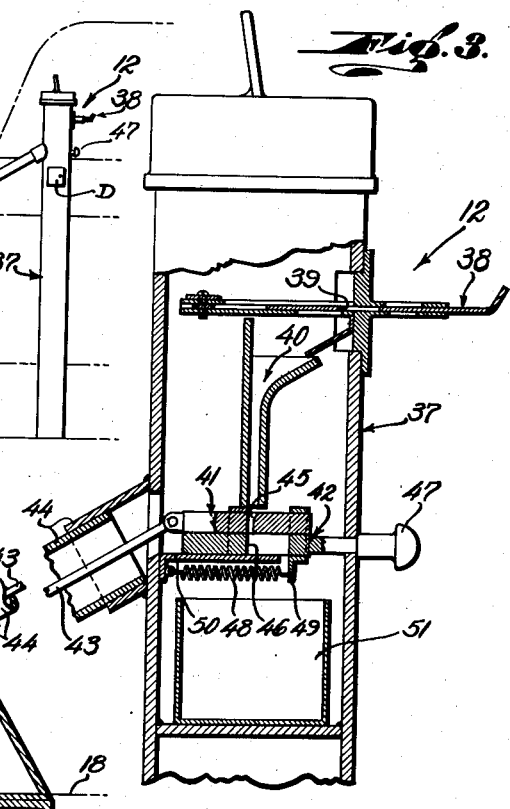
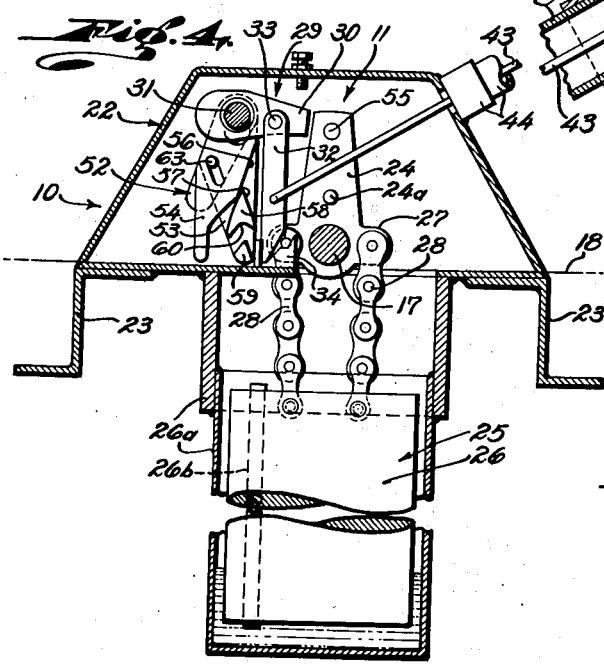
FRED P. DUNN
INVENTOR.
BY
ATTORNEY

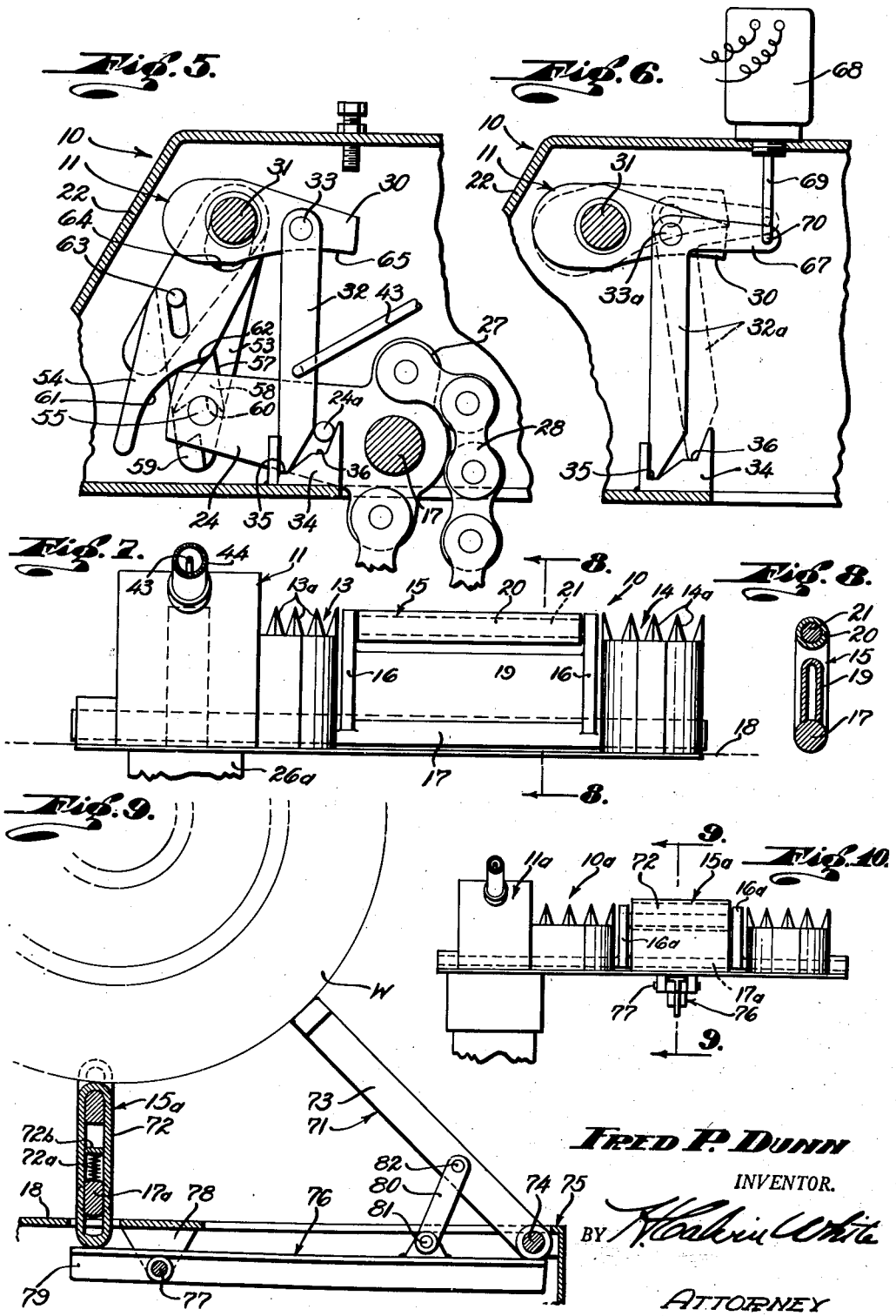

Patented Jan. 8, 1952

2,581,788

UNITED STATES PATENT OFFICE 2,581,788

PARKING LOT WAY CONTROL

Fred P. Dunn, Glendale, Calif.

Application September 17, 1946, Serial No. 697,582

20 Claims. (Cl. 39—6)

This invention has to do generally with the control of automobile traffic into or out of parking areas, and has for its general purpose to avoid the necessity of any constant attendant for the collection of parking fees, or more than a single attendant who by the later described remote controls, may service a given parking area having any appropriate arrangement of entrance and exit ways.

Primarily the invention is directed to a novel type of barrier to be used in one or more ways communicating with the parking area or lot, and operable to assure payment of the parking fee for any automobile entering or leaving the area, depending upon the barrier placement and as will later appear more in detail.

One major object is to provide within an entrance or exit way a movable barrier normally in the path of an automobile to prevent its advancement through the way, and retractible or displaceable to permit passage of the automobile through the way, by a remote control specifically of a coin or key or electrically operated type. Particularly the invention aims to permit release of the barrier by the driver seated in the automobile through operation of a coin control mechanism positioned at a location conveniently accessible to the driver.

In its more specific aspects the invention contemplates the use of a movable upstanding barrier positioned at the ground surface of the way to arrest advancement of a front wheel of the automobile, and normally retained in such position by a latch mechanism operable, as at a remote location, to release the barrier for movement to a position permitting passage of the wheel over it.

A particular feature of the invention is the employment of latch mechanisms operable to retain the barrier in lowered position after passage of the front wheel over it, and to subsequently release the barrier for assumption of its normal upstanding position, by virtue of passage of the rear wheel of the automobile over the barrier.

The invention has various additional objects having to do with such features as the mounting of the barrier for pivotal movement against the resistance of a mass tending to restore it to arresting position, the use of secondary barriers at the side of the movable barrier or beyond the latter in the direction of the vehicle advancement. All these, however, as well as the aforementioned objects and the various details of certain typical and illustrative embodiments of the invention, will be understood to better advantage from the following description of the accompanying drawings, in which:

Fig. 1 is a diagrammatic view illustrating several arrangements or locations of the control barrier for controlling the entrance and/or exit of cars to a parking lot;

Fig. 2 is a side elevation of the control barrier;

Fig. 3 is a fragmentary enlarged vertical section of the coin control for the barrier;

Fig. 4 is a vertical section through the locking mechanism for the barrier;

Fig. 5 is a fragmentary enlarged portion of Fig. 4 illustrating the parts in their intermediate latched position;

Fig. 6 is an optional form of release for the locking mechanism operated by a solenoid;

Fig. 7 is a front elevation of the barrier;

Fig. 8 is a vertical section taken on line 8—8 of Fig. 7;

Fig. 9 is an enlarged transverse sectional view taken on line 9—9 of Fig. 10, illustrating a modified form of barrier; and Fig. 10 is a front elevation of the barrier illustrated in Fig. 9.

The invention illustrated in Figs. 2 to 5 and 7 to 8, inclusive, for controlling the entrance and/or exit of a parking lot, includes generally a gate or barrier assembly 10 positioned in the path of the vehicle entering or leaving the lot. The operation of the barrier is governed by a locking mechanism 11 releasable by a remote control such as a coin controlled latch 12. The barrier 10 is positioned in the path of an on-coming vehicle entering or leaving the lot for engagement by the wheels at one side of the vehicle, and includes two spaced stationary abutments 13 and 14 and a retractible abutment 15 positioned between the abutments 13 and 14. The spaced abutments 13 and 14 may be provided with pointed guard spikes 13a and 14a, respectively. The retractible or releasable abutment 15 includes two normally upright arms 16 rigidly connected with a shaft 17 journaled in the stationary abutments 13 and 14 adjacent the surface of the ground line 18, as illustrated in Fig. 7. The arms 16 are tied together and braced by a central web 19 to have projecting ends for rotatably carrying a roller 20 on shaft 21.

The locking mechanism 11 is associated with the rectractible barrier portion 15 for controlling its operation in one direction and permits free operation in the opposite direction. The locking mechanism is housed in a case 22 attached to foundation members 23 at the ground line 18. The shaft 17 carrying the retractible barrier 15 extends into the housing 22 and is provided with an arm 24 rigidly attached thereto to move in direct relation to the barrier 15. A typical mehcanism 25 for returning the arm 24 and the barrier 15 to their normal upright positions, includes a weight 26 connected by a pair of flexible chains 28 with a pair of lugs 27 projecting from opposite sides of the arm 24. The weight 26 is preferably cylindrical, and is carried in container 26a attached to the underside of the housing 22. The container 26a may be filled part way with a fluid such as oil for dampening the action of the weight. An open ended tube 26b may extend through the weight from top to bottom so that each time the weight drops in the container, a surge of oil will discharge from the tube and spray the locking mechanism, lubricating its working parts.

The locking mechanism further includes latch means 29 at one side of the arm 24 for controlling its movement in one direction. The latch means 29 is preferably a gravity actuated latch including a pawl 30 pivotally carried on a shaft 31 mounted in the housing 22. The pawl normally is held in position, controlling movement of the arm 24 in one direction, by a prop 32 pivotally connected at one end to the pawl at 33 and having its lower end engaging a stepped control plate 34. The control plate 34, see Fig. 5, is provided with a lower step 35 and an upper step 36 adapted to receive the lower end of the prop 32.

The coin controlled latch 12 is operable to move the prop 32 from its normal down position of engagement with step 35 to its up position where it engages step 36 for retracting the pawl 30 and allowing free movement of the arm 24. The latch may be located at any point remote from the locking mechanism 11, though preferably at a position ahead or in advance of the barrier so that the coin control is accessible to the driver in a vehicle approaching the barrier 10, as illustrated in Fig. 2.

The latch 12, shown to be housed and carried at the upper end of a tubular post 37, includes a coin selector slide 38 of the type now in general use. The selector slide is provided with a coin receiving opening 39 and is operable to transfer a coin from the outside to the inside of the post 37 to deposit it in a coin slot 40 where it travels by gravity to be received by two reciprocable locking bolts 41 and 42. Bolt 41 is pivotally connected with the prop 32 by a control rod 43 extending from the upper end of the post to the prop within the housing 22, and is concealed by a tubular casing 44 coupled between the housing 22 and the post 37. The bolt 41 is provided with a coin slot 45 for receiving one-half of a coin while the bolt 42 has an opening 46 for receiving the other half of the coin. When received within the slot 45 and opening 46, the coin permits transmission of movement of the bolt 42 to the bolt 41 by a pull on knob 47 located at the outside of the post 37. Such movement of the bolts through the coin connection produces movement of the control rod 43 and in turn shifting of the prop 32 from its down position engaging step 35 to its up position engaging step 36, and resultant movement of the pawl 30 out of the path of the arm 24.

A spring 48 connected between a projection 49 on the bolt 42 and the bolt guiding bracket 50, returns the bolt 42 to its normal position illustrated in Fig. 3. The bolt 41, when actuated to shift the prop 32 to its up position through the coin received in the bolt slot, confines the coin between the forward wall of the slot 45 and the rear wall of the opening 46 in bolt 42 to retain the coin until the prop has shifted and the coin has passed the end of the bracket 50. The prop 32, while resting on the step 36, will hold the bolt 41 forward as the bolt 42 moves rearward towards its normal position, relieving the shear strain on the coin and permitting the coin to drop into a receptacle 51 which may be accessible through a door D in the side of the post 37.

The prop 32 with its lower end resting on the step 36, holds the pawl 30 out of the path of the arm 24 to permit movement of the arm. A pin 24a projects from the side of the arm 24 to engage the prop 32 upon movement of the arm 24 in its latch controlled direction. During movement of the arm 24, the pin engages and shifts the prop to its down position to recondition the pawl, see Fig. 5.

The locking mechanism 11 includes a holding latch 52 associated with the arm 24 for latching the arm and its interconnected abutment 15 in a retracted or down position upon the first impulse or operation of the abutment 15, produced by the front wheel of the vehicle, the holding latch being releasable upon a second impulse or operation of the abutment, produced by the rear wheel of the vehicle, to return the abutment to its normal upright position. The holding latch 52 includes a control plate 53 pivotally carried on the shaft 31 positioned at the opposite side of the pawl 30 from the prop 32. A cam plate 54 positioned adjacent the control plate and pivotally carried on the shaft 31, is connected with the control plate for limited relative movement, as subsequently will be more fully described. The control plate 53 and the cam plate 54 are gravity actuated and normally depend from the shaft 31.

Upon release of the pawl 30 by the coin controlled latch 12, the arm 24 is permitted to be moved by the wheel of the vehicle engaging the barrier abutment 15 and a pin 55 carried by the arm moves into engagement with surface 56 on the cam plate 54 to cause simultaneous pivoting of the control plate with the cam plate. Downward travel of the pin 55 on the surface 56 brings the pin into engagement with surface 57 on a latch lug 58 projecting from the side of the control plate 53. Continued downward movement of the pin 55 brings the pin to a position past the lug 58 and at a location to be engaged by a stop lug 59 at the lower end of the control plate 53. At this point the barrier and arm 24 are in a horizontal or retracted position and as the front wheel passes over the barrier 15, the weight 26 acting through the flexible connection 28 tends to return the arm to its up or normal position.

Upward or returning movement of the arm 24, however, is stopped as the pin 55 is received in a holding notch 60 in the underside of the latch lug 58 and holds the retractible barrier 15 in its retracted position until the rear wheel of the vehicle engages the barrier to release the pin 55 from the notch 60 and permit pivoting of the holding latch assembly by gravity as the pin passes between lug 58 and lug 59 until the camming surface 61 of the cam plate engages the pin 55. After the rear wheel has passed over the barrier 15, the arm 24 will move upwardly by the torsional strain transmitted to the arm through the weight 26. Upward movement of the arm 24 moves its pin 55 along the cam surface 61 and along the rear surface 62 of the lug 58. The cam plate 54 has limited movement relative to the control plate 53 by way of a pin and slot connection 63 and an elongated slot 64 in the cam plate for receiving the shaft 31. Upward movement of the pin 55 along the cam surface 61 transmits corresponding movement to the cam plate 54 to open a passage between the cam surface 61 and the surface 62 for passing the pin and permitting the arm 24 and the barrier 15 to return to their normal upright position. Upward movement of the arm 24 is unhampered upon leaving surface 62 since the pawl is free to trip upon engagement of arm 24 with its under surface 65. Such upward tripping of the pawl temporarily raises prop 32 from step 35, but because of the frictional resistance to movement offered by bolt 41, neither the bolt nor rod 43 is longitudinally displaced. Consequently, as pawl 30 again falls downwardly to the position of Fig. 4, prop 32 returns to step 35.

Fig. 6 illustrates an optional release for the pawl 30 or substitution for the coin control release, comprising a prop 32a pivotally connected with the pawl at 33a. The prop has an integral arm 67 connected with a solenoid 68 through rod 69 pivotally connected at 70 with the arm. It will be seen how energization of the solenoid 68 from a remote point will shift the prop 32a from the full line position illustrated in Fig. 6 to the dotted line position where its lower end rests on the step 36 of the stepped control plate 34.

Figs. 9 and 10 illustrate a safety stop or abutment 71 in conjunction with the barrier 10a. The latter may be identical in construction and operation to the above described barrier 10 except that the retractible abutment 15 is replaced by an abutment 15a having additional characteristics to produce actuation of the safety stop 71. The abutment 15a includes two upstanding arms 16a rigidly connected with the shaft 17a extending from the control mechanism 11a. A reciprocable wheel engaging plate 72 is carried by the arms 16a for relative reciprocation and bodily movable with the arms and the shaft under normal operation. The plate 72 is held in its normal extended position by springs 72a positioned between web 72b on the plate and the upper surface of the shaft 17a. In the event the operator of a vehicle tries to jump the barrier with his car without first releasing the locking mechanism through its coin latch, the weight of the car will cause downward reciprocation of the plate 72 and actuation of the safety stop 71.

The safety stop includes a ram 73 pivoted at 74 to the foundation 75 at a point forward of the barrier 10a and below the surface of the ground. An operating lever 76 pivoted at 77 by bracket 78 on the foundation 75 lies below the ground line 18 and has a rearwardly projecting arm 79 engageable by the lower end of the reciprocating plate 72. The ram 73 and the control lever 76 are connected together by a link 80 pivoted at 81 and 82 respectively with the lever and ram. It will be seen how the weight of the car transmitted by the wheel driving over the barrier, through the plate 72, causes upward pivoting of the lever 76 and upward pivoting of the ram 73 to a position in the path of the wheel for engagement therewith and preventing further movement of the vehicle. The outer end of the lever 76 may engage the under side of the pivotal connection 74, to limit upward movement of the lever 76 and the ram 73, to lend rigidity to the unit.

Fig. 1 illustrates typical installations of the barrier in a parking area. For example, coin controlled barriers 10 located at the entrance and/or exit of the parking area. A barrier 10b may be located at a side or other entrance and be electrically controlled from a remote station S. The coin controlled barrier 10 at the left hand side of Fig. 1 controls (requires payment to pass) the entrance to the area while permitting free exit through the same barrier. The barrier 10 at the right hand side of Fig. 1 controls the exit from the area and permits free entrance. When used, a remotely controlled barrier 10b at the side entrance to the area may serve to control the entrance to the area and be releasable by an attendant in station S to permit free exit from the area, or it may control the exit from the area and permit free entrance. It will be seen how any one of the barriers may be used individually to control the entrance and exit to a parking area through a single driveway, and how any desired combination of the barriers may be used to control a plurality of driveways.

In operation of a coin controlled barrier 10 located to control the entrance to a parking lot, the driver stops his car where the coin control unit 12 is accessible for operation by the driver while remaining in the car, and the front wheel of the car is in front of and in line with the retractible barrier abutment 15. Upon insertion of the proper coin into the selector slide 28, the slide is pushed in where the coin drops through the bottom of the slide and the coin slot 40 to be received by the locking bolts 41 and 42. The coin thus provides a coupling between the two bolts so that an outward pull on the knob 47 of the bolt 42 is transmitted to the bolt 41 to shift the prop 32 and release the pawl 30 from arm 24 interconnected with the retractible barrier abutment 15. The driver may then proceed into the lot and as the front wheel engages the barrier 15, the barrier and its rigidly connected arm 24 will pivot downward. The pin 24a carried on the arm will engage the prop 32 to recondition the pawl 30 and the pin 55 carried on the outer end of the arm will assume the position, illustrated in Fig. 5, where it is received in the notch 60 in the lug 58 on the control plate 53. The arm and the barrier abutment 15 will remain in this retracted position until the rear wheel engages the abutment, releasing the pin 55 from the notch 60 and permitting the return of the arm and abutment, by the weight element 26, to their normal upright position to be reengaged by the pawl 30 to control or prevent entrance until again released by the coin control 12. The barrier abutment 15 is free to permit passage of a car in the reverse direction allowing the car to be driven out of the lot.

If the barrier 10 is positioned to control the exit from a parking lot, the operation of the barrier is the same as described above except that the driver pays as he leaves. To accomplish this the unit 10 is turned 180° and positioned at the opposite side of the driveway to have its coin control accessible to the driver as he approaches the barrier.

It may also be desired to provide a coin control latch at the opposite sides of the unit so that the customer is compelled to pay both as he enters and leaves the lot. Again it may be desired to combine the coin controlled latch with a solenoid controlled latch in a single barrier unit, so that the customer has to pay as he enters, but is permitted to exit upon release of the barrier by an attendant. Further it may be desired to use a barrier unit 10b that is electrically controlled by an attendant permitting either controlled entrance and free exit, or vice versa; or if desired, a single barrier unit may be equipped with two solenoid controlled latches operating in opposite directions for controlling the entrance and the exit through a driveway, from a remote control station.

It is to be understood that the drawings are regarded merely as illustrative of the invention and certain of its typical and preferred embodiments, and that various changes and modifications may be made without departure from the invention in its intended spirit and scope.

I claim:

1. Control mechanism for an automobile parking area having a way through which the automobiles pass, comprising a vertically movable barrier in said way normally projecting upwardly from the ground in the path of a front wheel of an automobile passing through said way to arrest advancement of the automobile, a first latch means for normally retaining the barrier in its arresting position, means operable to release said latch means to permit lowering displacement of the barrier by the wheel in passing over it, a second latch means operable to retain the barrier in its lowered position after passage of the wheel over the barrier, and disengaging means operable by movement of said barrier upon passage of a second wheel of the automobile thereover to release said second latch means to permit said barrier to raise to normal upstanding position.

2. Control mechanism for an automobile parking area having a way through which the automobiles pass, comprising a vertically movable barrier in said way normally projecting upwardly from the ground in the path of a front wheel of an automobile passing through said way to arrest advancement of the automobile, a first latch means for normally retaining the barrier in its arresting position, means operable to release said latch means to permit lowering displacement of the barrier by the wheel in passing over it, a second latch means operable to retain the barrier in its lowered position after passage of the wheel over the barrier, gravity actuated means urging said barrier to assume said upstanding position, and disengaging means operable by movement of said barrier upon passage of a second wheel of the automobile thereover to release said second latch means to permit said barrier to raise to normal upstanding position.

3. Control mechanism for an automobile parking area having a way through which the automobiles pass, comprising a horizontal shaft extending transversely across said way adjacent the ground, a swinging vertically movable barrier on said shaft normally projecting upwardly from the ground in the path of a front wheel of an automobile passing through said way to arrest advancement of the automobile, latch means acting through said shaft to normally retain the barrier in its upstanding arresting position, and coin responsive mechanism operatively associated with said latch means and operable upon reception of a coin to release said latch means to permit downward swinging of the barrier and movement of the wheel over the barrier.

4. Control mechanism for an automobile parking area having a way through which the automobiles pass, comprising a horizontal shaft extending transversely across said way adjacent the ground, a swinging vertically movable barrier on said shaft normally projecting upwardly from the ground in the path of a front wheel of an automobile passing through said way to arrest advancement of the automobile, latch means acting through said shaft to normally retain the barrier in its upstanding arresting position, a heavy mass connected to said shaft and tending by gravity to retain said barrier in upstanding position, and coin responsive mechanism operatively associated with said latch means and operable upon reception of a coin to release said latch means to permit downward swinging of the barrier and movement of the wheel over the barrier.

5. Control mechanism for an automobile parking area having a way through which the automobiles pass, comprising a horizontally extending shaft, a swinging vertically movable barrier on said shaft normally projecting upwardly from the ground in the path of a front wheel of an automobile passing through said way to arrest advancement of the automobile, latch means acting through said shaft to normally retain the barrier in its upstanding arresting position, a heavy mass connected to said shaft and tending by gravity to retain said barrier in upstanding position, means operable to release said latch means to permit downward swinging of the barrier and movement of the wheel over the barrier, a second latch means operable to retain the barrier in its lowered position after passage of the wheel over the barrier, and disengaging means operable by movement of said barrier upon passage of a second wheel of the automobile thereover to release said second latch means to permit the barrier to return to normal upstanding position.

6. Control mechanism for an automobile parking area having a way through which the automobiles pass, comprising a horizontally extending shaft, a swinging vertically movable barrier on said shaft normally projecting upwardly from the ground in the path of a front wheel of an automobile passing through said way to arrest advancement of the automobile, latch means acting through said shaft to normally retain the barrier in its upstanding arresting position, a rod connected to said latch means and extending to a remote location, said rod being operable to release said latch means to permit downward swinging of the barrier and movement of the wheel over the barrier, restoring means urging said barrier to assume said upstanding position, a second latch means operable to retain the barrier in its lowered position after passage of the wheel over the barrier, and disengaging means operable by movement of said barrier upon passage of a second wheel of the automobile thereover to release said second latch means to permit said barrier to raise to normal upstanding position.

7. Control mechanism for an automobile parking area having a way through which an automobile advances into the area, comprising a barrier movable between an automobile arresting position in said way and an automobile passing position, means mounting the barrier for movement in a predetermined direction between said positions by force exerted by an automobile, a movable member governing the movement of the barrier in said direction by said force and movable between a first condition in which the barrier is free for movement in said direction and a second condition in which the barrier is retained against said movement, and coin responsive mechanism operatively associated with said member and operable upon reception of a coin to actuate said member to a predetermined one of said conditions.

8. Control mechanism for an automobile parking area having a way through which an automobile advances into the area, comprising a barrier projectible upwardly in said way from adjacent the ground to a position preventing the passage of an automobile and displaceable downwardly to a vehicle passing position, means mounting the barrier for movement in a predetermined direction between said positions by force exerted by an automobile, a movable member governing the movement of the barrier in said direction by said force and movable between a first condition in which the barrier is free for movement in said direction and a second condition in which the barrier is retained against said movement, and coin responsive mechanism operatively associated with said member and operable upon reception of a coin to actuate said member to a predetermined one of said conditions.

9. Control mechanism for an automobile parking area having a way through which automobiles may pass in opposite directions, comprising a barrier normally projecting upwardly in said way from adjacent the ground to a vehicle arresting position, means mounting the barrier for swinging movement about an axis extending generally horizontally across the way and near the ground so that the barrier may be swung downwardly in opposite directions by automobiles passing through the way in opposite directions, holding means for releasably maintaining said barrier against said downward swinging movement in one of said directions while permitting downward swinging movement in the opposite direction to thus permit automobile passage in only one direction through the way, and means for releasing said holding means to permit the passage of an automobile in the other direction through the way.

10. Control mechanism for an automobile parking area having a way through which automobiles may pass in opposite directions, comprising a barrier normally projecting upwardly in said way from adjacent the ground to a vehicle arresting position, means mounting the barrier for swinging movement about an axis extending generally horizontally across the way and near the ground so that the barrier may be swung downwardly in opposite directions by automobiles passing through the way in opposite directions, holding means for releasably maintaining said barrier against said downward swinging movement in one of said directions while permitting downward swinging movement in the opposite direction to thus permit automobile passage in only one direction through the way, and coin controlled mechanism operatively connected to said holding means and operable upon reception of a coin to release the holding means and permit the passage of an automobile in the other direction through the way.

11. Control mechanism for an automobile parking area having a way through which an automobile advances into the area, comprising a barrier movable between an automobile arresting position in said way and an automobile passing position, means mounting the barrier for movement in a predetermined direction between said positions by force exerted by an automobile, a movable member governing the movement of the barrier in said direction by said force and movable between a first condition in which the barrier is free for movement in said direction and a second condition in which the barrier is retained against said movement, coin responsive actuating mechanism positioned at a location remote from said member and accessible to a driver in an automobile, and a second member extending between said mechanism and said first mentioned member to form a mechanical connection therebetween whereby actuation of said mechanism is effective to actuate said first mentioned member to a predetermined one of said conditions.

12. Control mechanism for an automobile parking area having a way through which an automobile advances into the area, comprising a barrier projectible upwardly in said way from adjacent the ground to a position preventing the passage of an automobile and displaceable downwardly to a vehicle passing position, means mounting the barrier for movement in one direction between said positions in response to force exerted thereagainst by an automobile, holding means for releasably maintaining the barrier in one of said positions and movable between active and released conditions, and coin responsive mechanism operatively associated with said holding means and operable upon reception of a coin to actuate said holding means to a predetermined one of said conditions.

13. Control mechanism for an automobile parking area having a way through which an automobile advances into the area, comprising a barrier projectible upwardly in said way from adjacent the ground to a position preventing the passage of an automobile and displaceable downwardly to a vehicle passing position, means mounting the barrier for movement in one direction between said positions in response to force exerted thereagainst by an automobile, holding means for releasably maintaining the barrier in one of said positions, and movable between active and released conditions, and coin responsive mechanism operatively associated with said holding means and operable upon reception of a coin to release said holding means.

14. Control mechanism for an automobile parking area having a way through which an automobile advances into the area, comprising a barrier projectible upwardly in said way from adjacent the ground to a first position preventing the passage of an automobile and displaceable downwardly to a vehicle passing position, means mounting the barrier for movement in one direction between said positions in response to force exerted thereagainst by an automobile, holding means for releasably maintaining the barrier in said first position and movable between active and released conditions, and coin responsive mechanism operatively associated with said holding means and operable upon reception of a coin to release said holding means.

15. Control mechanism for an automobile parking area having a way through which an automobile advances into the area, comprising a barrier projectible upwardly in said way from adjacent the ground to a position preventing the passage of an automobile and pivotable downwardly about an axis extending transversely of said way to a vehicle passing position, means mounting the barrier for pivotal movement in one direction between said positions in response to force exerted thereagainst by an automobile, holding means for releasably maintaining the barrier in one of said positions and movable between active and released conditions, and coin responsive mechanism operatively associated with said holding means and operable upon reception of a coin to actuate said holding means to a predetermined one of said conditions.

16. Control mechanism for an automobile parking area having a way through which an automobile advances into the area, comprising a barrier projectible upwardly in said way from adjacent the ground to a position preventing the passage of an automobile and displaceable downwardly to a vehicle passing position, means mounting the barrier for movement between said positions in response to force exerted thereagainst by an automobile, means normally urging said barrier toward one of said positions, holding means for releasably maintaining the barrier in said one position and movable between active and released conditions, and coin responsive mechanism operatively associated with said holding means and operable upon reception of a coin to actuate said holding means to a predetermined one of said conditions.

17. Control mechanism for an automobile parking area having a way through which an automobile advances into the area, comprising a barrier projectible upwardly in said way from adjacent the ground to a position preventing the passage of an automobile and displaceable downwardly to a vehicle passing position, means mounting the barrier for movement in one direction between said positions in response to force exerted thereagainst by an automobile, means normally urging said barrier toward said arresting position, holding means for releasably maintaining the barrier in said arresting position and movable between active and released conditions, and coin responsive mechanism operatively associated with said holding means and operable upon reception of a coin to release said holding means.

18. Control mechanism for an automobile parking area having a way through which an automobile advances into the area, comprising a barrier projectible upwardly in said way from adjacent the ground to a position preventing the passage of an automobile and displaceable downwardly to a vehicle passing position, means mounting the barrier for movement to said passing position in response to force exerted thereagainst by an automobile, holding means for releasably maintaining the barrier in said arresting position and movable between active and released conditions, and coin responsive mechanism operatively associated with said holding means and operable upon reception of a coin to release said holding means to permit downward displacement of the barrier to said passing position, and a second holding means operable to positively retain said barrier in said passing position after displacement thereto.

19. Control mechanism for an automobile parking area having a way through which an automobile advances into the area, comprising a barrier projectible upwardly in said way from adjacent the ground to a vehicle arresting position and displaceable downwardly to a position preventing the passage of an automobile, means mounting the barrier for movement to said passing position in response to force exerted thereagainst by an automobile, holding means for releasably maintaining the barrier in said arresting position and movable between active and released conditions, and coin responsive mechanism operatively associated with said holding means and operable upon reception of a coin to release said holding means to permit downward displacement of the barrier to said passing position, a second holding means operable to positively retain said barrier in said passing position after displacement thereto, and disengaging means responsive to advancement of the automobile to release said holding means for restoration of the barrier to said arresting position.

20. Control mechanism for an automobile parking area having a way through which the automobiles pass, comprising a vertically movable barrier in said way normally projecting upwardly from the ground in the path of a front wheel of an automobile passing through said way to arrest advancement of the automobile, holding means normally retaining the barrier in its arresting position, means operable to release said holding means and permit lowering displacement of the barrier and movement of the wheel over the barrier, and a secondary movable barrier connected to the first mentioned barrier and operable by movement of a wheel over said first mentioned barrier to arrest advancement of said wheel.

FRED P. DUNN.

REFERENCES CITED

The following references are of record in the file of this patent:

UNITED STATES PATENTS

| Number | Name | Date |
|---|---|---|
| 1,389,271 | Robertson | Aug. 30, 1921 |
| 1,619,070 | Golding | Mar. 1, 1927 |
| 1,726,724 | Warren | Sept. 3, 1929 |
| 1,734,748 | Steinkamp | Nov. 5, 1929 |
| 1,791,922 | Distler et al. | Feb. 10, 1931 |
| 1,791,997 | Benton | Feb. 10, 1931 |
| 1,878,234 | Goodman | Sept. 20, 1932 |
| 2,015,607 | Shinn | Sept. 24, 1935 |
| 2,073,834 | Duany et al. | Mar. 16, 1937 |
| 2,200,639 | Rice | May 14, 1940 |
| 2,244,117 | Preston | June 3, 1941 |
| 2,528,790 | Scherer | Nov. 7, 1950 |

FOREIGN PATENTS

| Number | Country | Date |
|---|---|---|
| 16,011 | France | Aug. 16, 1912 |
| 302,453 | Great Britain | Dec. 20, 1928 |
| 2,678 | Australia | 1931 |
| 20,978/35 | Australia | Jan. 30, 1936 |
| 100,747 | Australia | Apr. 22, 1937 |